(12) United States Patent
Jeong et al.

(10) Patent No.: US 10,825,272 B1
(45) Date of Patent: Nov. 3, 2020

(54) IMAGE DATA ACCESS CONTROL APPARATUS FOR VEHICLE AND METHOD THEREOF

(71) Applicants: HYUNDAI MOTOR COMPANY, Seoul (KR); KIA MOTORS CORPORATION, Seoul (KR)

(72) Inventors: Dong Hyuk Jeong, Hwaseong-si (KR); Jae Sun Han, Seoul (KR); Dong Woo Kim, Hwaseong-si (KR); Kyu Hwan Chin, Seoul (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 16/545,244

(22) Filed: Aug. 20, 2019

(30) Foreign Application Priority Data

Apr. 22, 2019 (KR) .......................... 10-2019-0046762

(51) Int. Cl.
*H04N 7/18* (2006.01)
*G07C 5/08* (2006.01)
*H04L 29/06* (2006.01)
*G07C 5/00* (2006.01)

(52) U.S. Cl.
CPC ........... *G07C 5/0866* (2013.01); *G07C 5/008* (2013.01); *H04L 63/0876* (2013.01)

(58) Field of Classification Search
None
See application file for complete search history.

(56) References Cited

U.S. PATENT DOCUMENTS

| 8,095,265 | B2* | 1/2012 | Boss | H04N 5/76 |
| | | | | 701/33.4 |
| 2006/0187305 | A1* | 8/2006 | Trivedi | G06K 9/00241 |
| | | | | 348/169 |
| 2013/0019111 | A1* | 1/2013 | Martin | H04L 9/0637 |
| | | | | 713/193 |
| 2019/0253623 | A1* | 8/2019 | Lim | H04N 5/2353 |
| 2019/0279447 | A1* | 9/2019 | Ricci | B60R 25/25 |
| 2019/0367036 | A1* | 12/2019 | Brombach | G06K 9/00832 |

FOREIGN PATENT DOCUMENTS

KR 10-2015-0138980 12/2015

\* cited by examiner

*Primary Examiner* — Peet Dhillon
(74) *Attorney, Agent, or Firm* — Brinks Gilson & Lione

(57) ABSTRACT

Disclosed are an image data access control apparatus for a vehicle and a method thereof. The image data access control apparatus for a vehicle includes storage that stores image data of the vehicle, a communicator that communicates with a user device, an authentication processor that authenticates the user device, and a controller that determines whether the user device can have access to the image data based on an authentication result of the authentication processor.

16 Claims, 5 Drawing Sheets

IMAGE DATA ACCESS CONTROL APPARATUS FOR VEHICLE AND METHOD THEREOF

CROSS-REFERENCE TO RELATED APPLICATION

This application claims priority to and the benefit of Korean Patent Application No. 10-2019-0046762, filed on Apr. 22, 2019, the entire contents of which are incorporated herein by reference.

FIELD

The present disclosure relates to a technique for controlling access to image data of a vehicle.

BACKGROUND

The statements in this section merely provide background information related to the present disclosure and may not constitute prior art.

Generally, a driving image recording apparatus (a so-called black box) of a vehicle is a device for photographing and recording peripheral images (front and rear images, or the like) of a vehicle that may be used to figure out what happened before or during a traffic accident occurred while the vehicle was driven.

Such a driving image recording apparatus for a vehicle uses a removable disk (e.g., a mini SD card, an SD card, a USB memory, or the like) as storage and generates a folder for a recorded image and a folder for an event recording image to store a normal recording image (i.e., a driving image) and the event recording image (i.e., the image of a section in which an impact occurs) in each folder.

The stored image may be easily exposed to anyone who can access the interior of a vehicle. In particular, when valet parking is used at a restaurant, an airport, a hotel, or the like, a valet may view or delete the recorded image to hide a light-touching accident that occurred during the parking process.

As a conventional technique for solving this problem, there has been proposed a scheme of setting a password in a recording file. However, we have found that it is troublesome that the owner of the vehicle has to directly input a password in order to have access to (view, delete, and the like) the recorded file. In addition, even when the password is forgotten, it may be impossible to have access to the recording file.

SUMMARY

An aspect of the present disclosure provides an image data access control apparatus for a vehicle which is capable of protecting image data from unauthorized users by allowing only a previously registered user to have access to the image data (recorded driving video) of the vehicle.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, an image data access control apparatus for a vehicle includes: a storage that stores image data of the vehicle, a communicator that communicates with a user device, an authentication processor that authenticates the user device, and a controller that determines whether the user device is able to have access to the image data based on an authentication result of the authentication processor.

The authentication processor and the controller may be connected to each other through a vehicle network.

The storage may include a storage embedded in the vehicle.

The controller may receive a request for access to the image data through a user interface of an audio video navigation (AVN) system provided in the vehicle, and may receive a request for access to the image data through a universal serial bus (USB) terminal provided in the vehicle.

The controller may be activated when power is supplied to an electric load of the vehicle.

The controller may transmit a text message informing of an attempt to access the image data to a user device of a vehicle owner when an unauthorized user attempts to access the image data.

The controller may assign different rights based on classes of user devices.

The communicator may communicate with the user device through at least one of Bluetooth™, radio frequency identification (RFID), infrared data association (IrDA), ultra wide band (UWB), ZigBee, or near field communication (NFC).

The authentication processor may authenticate the user device based on a list of previously recorded user devices that have a permit to access to the image data.

According to another aspect of the present disclosure, a method of controlling access to image data of a vehicle includes: storing, by a storage, image data recorded by the vehicle; communicating, by a communicator, with a user device; authenticating, by an authentication processor, the user device; and determining, by a controller, whether the user device has a permit to access to the image data based on an authentication result.

The determining of whether the user device has a permit to access to the image data may include: receiving the authentication result from the authentication processor through a vehicle network.

The storing of the image data of the vehicle may include storing the image data in a storage embedded in the vehicle.

The determining of whether the user device has a permit to access to the image data may include: receiving a request for access to the image data through a user interface of an audio video navigation (AVN) system provided in the vehicle, or receiving a request for access to the image data through a universal serial bus (USB) terminal provided in the vehicle.

The determining of whether the user device has a permit to access to the image data may be performed when power is supplied to an electric load of the vehicle.

The method may further include transmitting a text message informing of an attempt to access the image data to a user device of a vehicle owner when an unauthorized user attempts to access the image data.

The determining of whether the user device has a permit to access to the image data may include: assigning different rights based on classes of user devices.

The communicating with the user device may include communicating with the user device through at least one of Bluetooth™, radio frequency identification (RFID), infrared data association (IrDA), ultra wide band (UWB), ZigBee, or near field communication (NFC).

The authenticating of the user device may include authenticating the user device based on a list of recorded user devices previously permitted to access to the image data.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
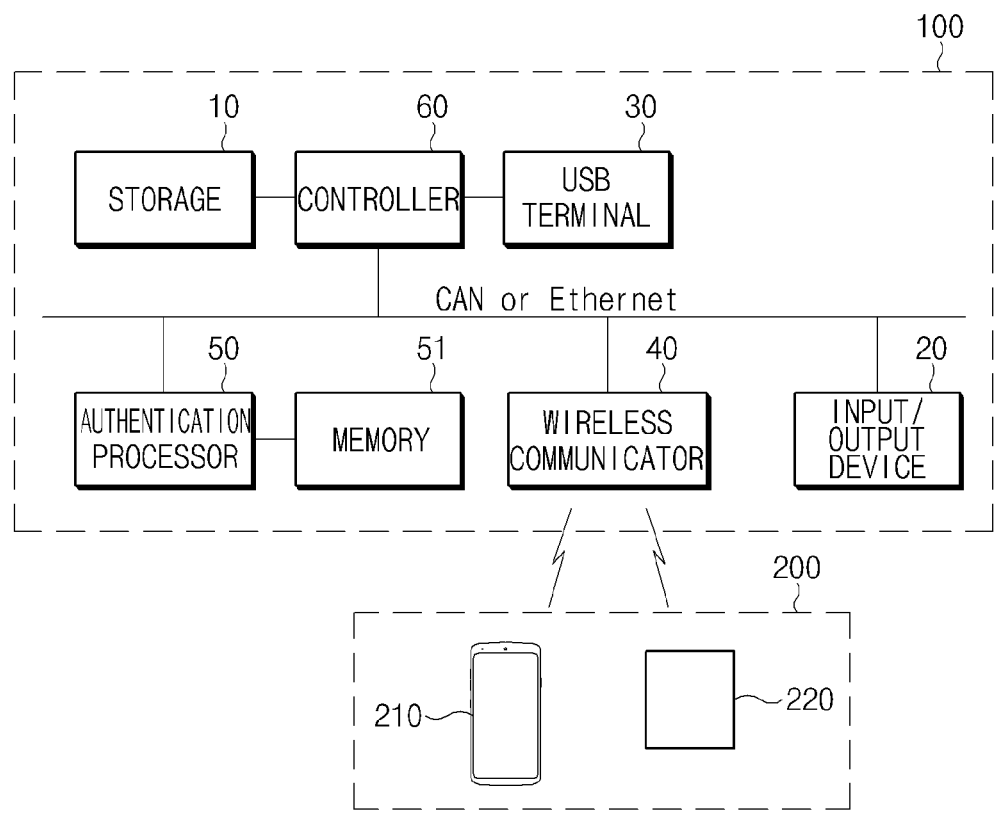
FIG. 1 is a block diagram illustrating a configuration of an image data access control apparatus for a vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

Hereinafter, some forms of the present disclosure will be described in detail with reference to the exemplary drawings. In adding the reference numerals to the components of each drawing, it should be noted that the identical or equivalent component is designated by the identical numeral even when they are displayed on other drawings. Further, in describing the form of the present disclosure, a detailed description of well-known features or functions will be ruled out in order not to unnecessarily obscure the gist of the present disclosure.

In describing the components of the form according to the present disclosure, terms such as first, second, "A", "B", (a), (b), and the like may be used. These terms are merely intended to distinguish one component from another component, and the terms do not limit the nature, sequence or order of the constituent components. Unless otherwise defined, all terms used herein, including technical or scientific terms, have the same meanings as those generally understood by those skilled in the art to which the present disclosure pertains. Such terms as those defined in a generally used dictionary are to be interpreted as having meanings equal to the contextual meanings in the relevant field of art, and are not to be interpreted as having ideal or excessively formal meanings unless clearly defined as having such in the present application.

FIG. 1 is a block diagram illustrating a configuration of an image data access control apparatus for a vehicle according to one form of the present disclosure.

As illustrated FIG. 1, an image data access control apparatus 100 for a vehicle may include: storage 10, an input/output device 20, a universal serial bus (USB) terminal 30, a wireless communicator 40, an authentication processor 50, and a controller 60. In this case, according to the scheme of implementing the image data access control apparatus 100 for the vehicle according to another form of the present disclosure, components may be combined with one another, or some components may be omitted.

Referring to each component, the storage 10 may store image data of the vehicle (the recorded driving image). In this case, the image data may be stored in the form of a recording file.

The storage 10 may store various kinds of logic, algorithms, and programs required for allowing a previously registered user to have access to image data.

The storage 10 may include at least one type of a storage medium of memories of a flash memory type, a hard disk type, a micro type, a card type (e.g., a secure digital (SD) card or an extreme digital (XD) card), and the like and a random access memory (RAM), a static RAM (SRAM), a read-only memory (ROM), a programmable ROM (PROM), an electrically erasable PROM (EEPROM), a magnetic RAM (MRAM), a magnetic disk, and an optical disk type memory.

When the storage 10 is implemented with removable storage device such as a USB memory, the user may arbitrarily attach and detach the device. However, when the storage 10 is implemented with an embedded storage device, the user cannot attach and detach the device arbitrarily.

The input/output device 20 may reproduce (decodes) the image data stored in the storage 10 and display it on a screen. The input/output device 20 may provide a user interface for receiving a request for reproducing or deleting image data from the user. In this case, the user interface may provide all general editing functions (selection, reproduction, deletion, search, setting, and the like).

The input/output device 20 may be implemented with an audio video navigation (AVN) system (not shown) provided in the vehicle. In this case, the user may execute an icon displayed on the screen by using a user interface (a touch input, a button input, a switch input, or the like) provided in the AVN system to attempt to have access to the image data stored in the storage 10. In addition, the AVN system may provide various functions for editing the image data to authorized users.

The input/output device 20 may be connected to a vehicle network to receive image data from the controller 60, and may transmit a user input to the controller 60. In this case, the vehicle network includes a controller area network (CAN), a local interconnect network (LIN), FlexRay, Media Oriented Systems Transport (MOST), Ethernet, and the like.

The USB terminal 30, which is a terminal to which a USB memory, a USB wireless LAN card, a USB cable, and the like are connected, may receive a request for access to the image data stored in the storage 10.

The wireless communicator 40, which is a module for communicating with a user device 200 such as a smartphone 210, a card key 220, and the like, may support near field communication by using at least one of Bluetooth™, radio frequency identification (RFID), Infrared Data Association (IrDA), Ultra Wide Band (UWB), ZigBee, Near Field Communication (NFC) and Wireless Universal Serial Bus (USB) technologies.

Hereinafter, the NFC technology which is most applicable due to high security will be described in detail.

The NFC technique is a non-contact short-range wireless communication standard that enables wireless communication between electronic devices at a low power within a short distance of 10 cm or less using a frequency of 13.56 MHz. The NFC has a transmission rate of 424 Kbps and excellent security due to the proximity characteristics and encryption technology, and enables devices to recognize each other during 1/10 second or less without requiring a complicated pairing procedure. In particular, although the NFC technology is based on RFID technology, the NFC is bi-directional, as compared to smart cards, has a relatively large storage memory space, and has a wide range of applicable services.

The NFC is a wireless communication scheme of directly exchanging data between devices, for example, between the wireless communicator 40 and the smartphone 210 without using a communication network, and is a kind of RFID scheme. The wireless communication scheme using RFID may be classified based on the used frequency. For example, there are RFID in the 13.56 MHz band mainly used for smart cards such as traffic cards and entrance cards, and RFID in the 900 MHz band mainly used for logistics. The NFC corresponds to RFID using frequency of 13.56 MHz band like a smart card. However, unlike the smart card that can communicate only in one direction, there is a crucial difference that NFC is capable of bi-directional communication. Therefore, the NFC is different from a smart card having only a tag function of storing specific information and transmitting it to a reader. The NFC may support not only the tag function but also a function of recording information in a tag as desired, and may also be used for peer-to-peer (P2P) information exchange between NFC-equipped devices.

Unlike Bluetooth, Wi-Fi, or the like, which may communicate from several meters to tens of meters, the NFC can communicate only at an extremely short distance (about 10 cm). That is, when compared with other wireless communication schemes, the NFC is operated only at a distance of 10 cm or less, and encryption technology is applied, so that the security is high. Thus, when used in combination with other high-speed wireless communication schemes such as 3G, Wi-Fi, and the like, the NFC may make it possible to communicate more efficiently between devices. For example, when combining the NFC technology and the Bluetooth technology, the NFC technology may be used for connection (authentication) between devices, and the Bluetooth technology may be used for data transmission between devices, so that the devices may communicate more securely and efficiently.

When the wireless communicator 40 is implemented with a NFC module, the NFC module recognizes the approach of the smartphone 210 and the card key 220 having the NFC function according to the NFC protocol. In order to activate the NFC function and establish the connection, the smartphone 210 and the card key 220 having the NFC function corresponding to clients must approach another NFC device (NFC module) corresponding to a host within the approximate range of 10 cm or less.

Thus, the NFC module recognizes the approach of the user device 200 and tags the user device. In addition, the NFC module receives an NFC data exchange format (NDEF) message defined in the NFC standard from the user device 200 and receives identification information of the user device 200 included in the NDEF message.

In case of the smartphone 210, the identification information included in the NDEF message may include information existing uniquely in the smartphone 210 such as a MAC address, an Internet protocol address, a phone number, a personal identification number (PIN), and the like.

Figure 2:
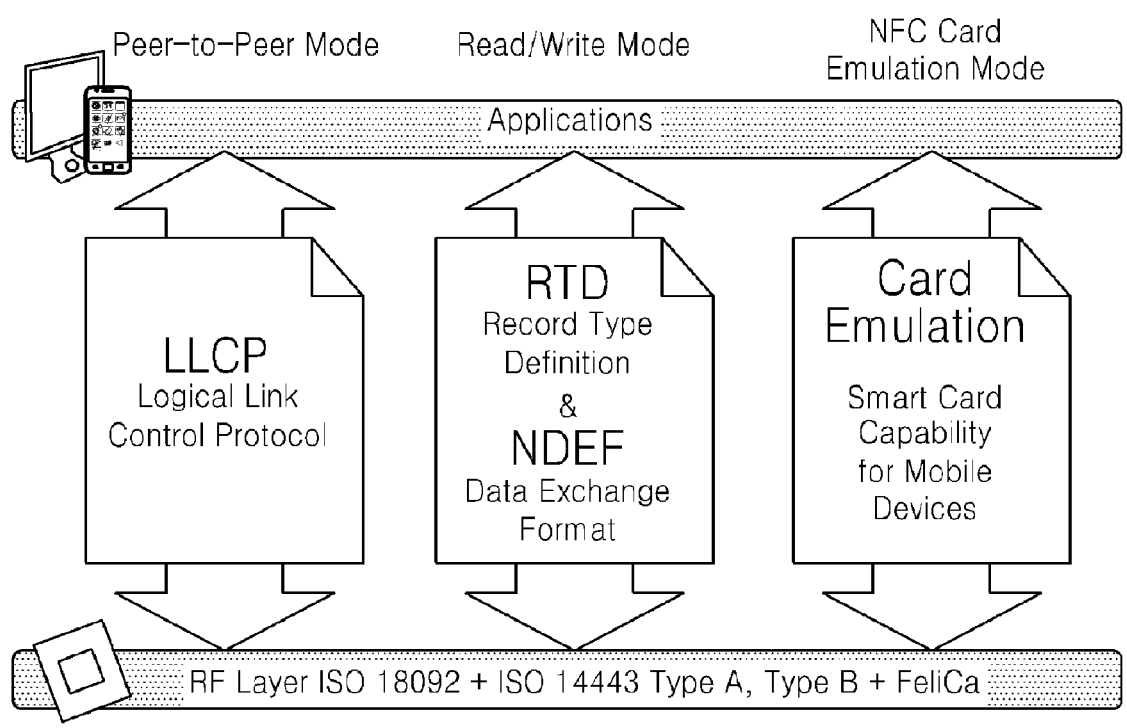
FIG. 2 is a view illustrating the NFC communication protocol used in the present disclosure.

FIG. 2 is a view illustrating the NFC communication protocol used in one form of the present disclosure.

As shown in FIG. 2, a logical link control protocol (LLCP) is a protocol that performs functions of communication connection and control between layers.

The NDEF message has a basic message structure defined in the NFC communication protocol. The NDEF, in which a record format for message exchanges between compatible devices and tags is defined in the NFC Forum, is a standard exchange format for a uniform resource identifier (URI), a smart poster, and others. The NDEF message includes one NDEF record or more. The NDEF record includes a payload described by each of type, length, and option identifiers. The NDEF payload refers to application data included in the NDEF record.

Record type definition (RTD) defines a record type and a type name that may correspond to the NDEF record.

The authentication processor 50 may determine whether the user device 200 is an authenticated device based on the identification information of the user device 200. In this case, the authentication processor 50 may include a memory 51 in which a list of user devices permitted to have access to image data is stored.

The authentication processor 50 may set a rating for each user device that is permitted to have access to the image data in response to a request from the owner of a vehicle. For example, the vehicle owner may set his or her rating to '1', the family to '2', and an acquaintance to '3'.

The controller 60 performs overall control such that each of the components performs the function normally. The controller 60 may be implemented in the form of hardware (e.g., a processor) or software, or a combination of hardware and software. The controller 60 may be implemented with a microprocessor, but is not limited thereto.

The controller 60 may perform all the functions that a controller included in a driving-image recording device performs in the same manner. That is, the controller 60 may generate a folder for a recording image and a folder for an event recording image in the storage 10, and stores the normal recording image (i.e., running image) and the event recording image (i.e., the image of the section in which impact occurs) in the respective folders. In this case, the controller 60 is activated in a state where power is supplied to the electric loads (e.g., an ignition switch, a door-lock switch, a light etc.) of the vehicle because the controller 60 interworks with the vehicle. Therefore, the user cannot inactivate the driving image recording function by arbitrarily inactivating the controller 60 while the vehicle is in the turn-on state.

When the controller 60 receives a request for access to the image data stored in the storage 10 through the input/output device 20, the controller 60 determines whether the image data is accessible based on the authentication result from the authentication processor 50. That is, when an authentication result indicating that the user is an authorized user is transmitted from the authentication processor 50, the controller 60 permits access to the image data stored in the storage 10. When an authentication result indicating that the user is an unauthorized user is transmitted or no authentication result is transmitted, the access to the image data stored in the storage 10 is not permitted.

When the controller 60 receives a request for access to the image data stored in the storage 10 through the USB terminal 30 provided in the vehicle, the controller 60 determines whether the image data is accessible based on the authentication result from the authentication processor 50. That is, when an authentication result indicating that the user is an authorized user is transmitted from the authentication processor 50, the controller 60 permits access to the image data stored in the storage 10, or when an authentication result indicating that the user is an unauthorized user is transmitted or when no authentication result is transmitted, the access to the image data stored in the storage 10 is not permitted.

The controller 60 may assign different rights according to the classes of user devices to limit a permitted user's capability. For example, the controller 60 may provide all functions (selection, reproduction, deletion, search, setting, and the like) for editing the image data stored in the storage 10 when the user device has the first class, and when the user device has the second class, it is only possible to reproduce image data. Of course, in the case of a valet, because the authentication is impossible, the controller 60 does not permit to have access to the image data stored in the storage 10.

When an unauthorized user attempts to have access to the image data in cooperation with a telematics terminal provided in the vehicle, the controller 60 may transmit a text message for informing of the fact to the smartphone 210 of the vehicle owner.

Figure 3:
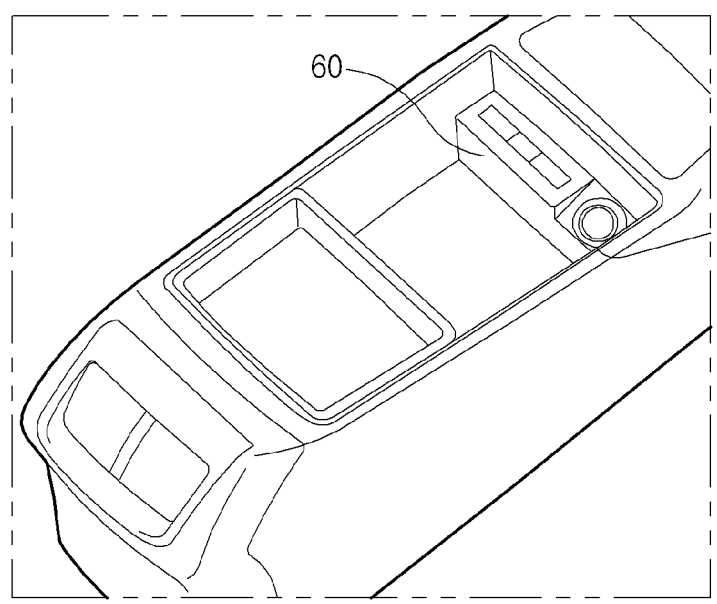
FIG. 3 is a view illustrating a mounting position of a controller included in an image data access control apparatus of a vehicle.

As shown in FIG. 3, the controller 60 may be mounted inside a console in consideration of usability.

Figure 4:
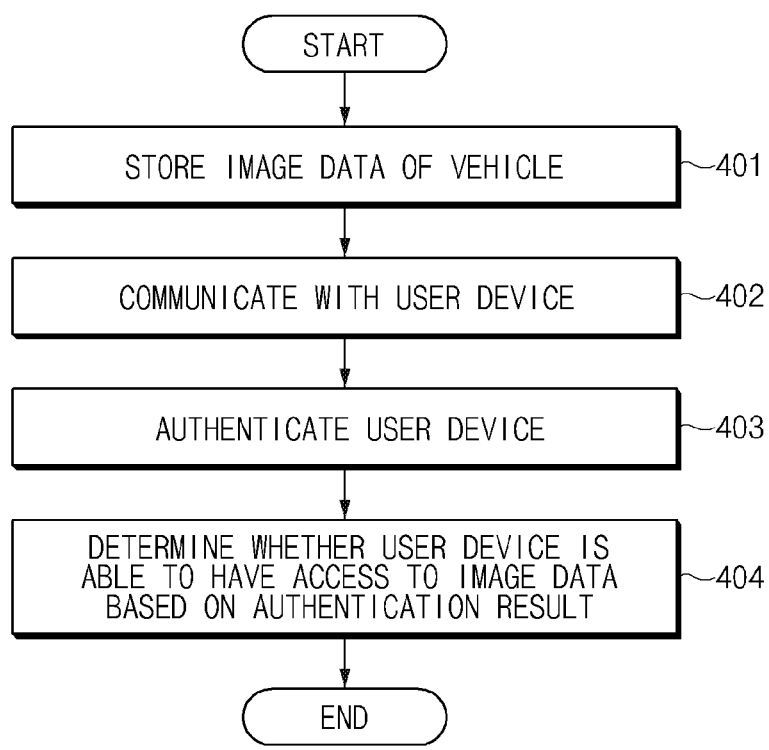
FIG. 4 is a flowchart illustrating an image data access control method of a vehicle.

FIG. 4 is a flowchart illustrating an image data access control method of a vehicle according to one form of the present disclosure.

First, the storage 10 stores the image data of the vehicle in operation 401.

Thereafter, the wireless communicator 40 communicates with the user device for authentication in operation 402.

Thereafter, the authentication processor 50 authenticates the user device in operation 403.

Thereafter, the controller 60 determines whether the user device can have access to the image data based on the authentication result of the authentication processor 50 in operation 404.

Figure 5:
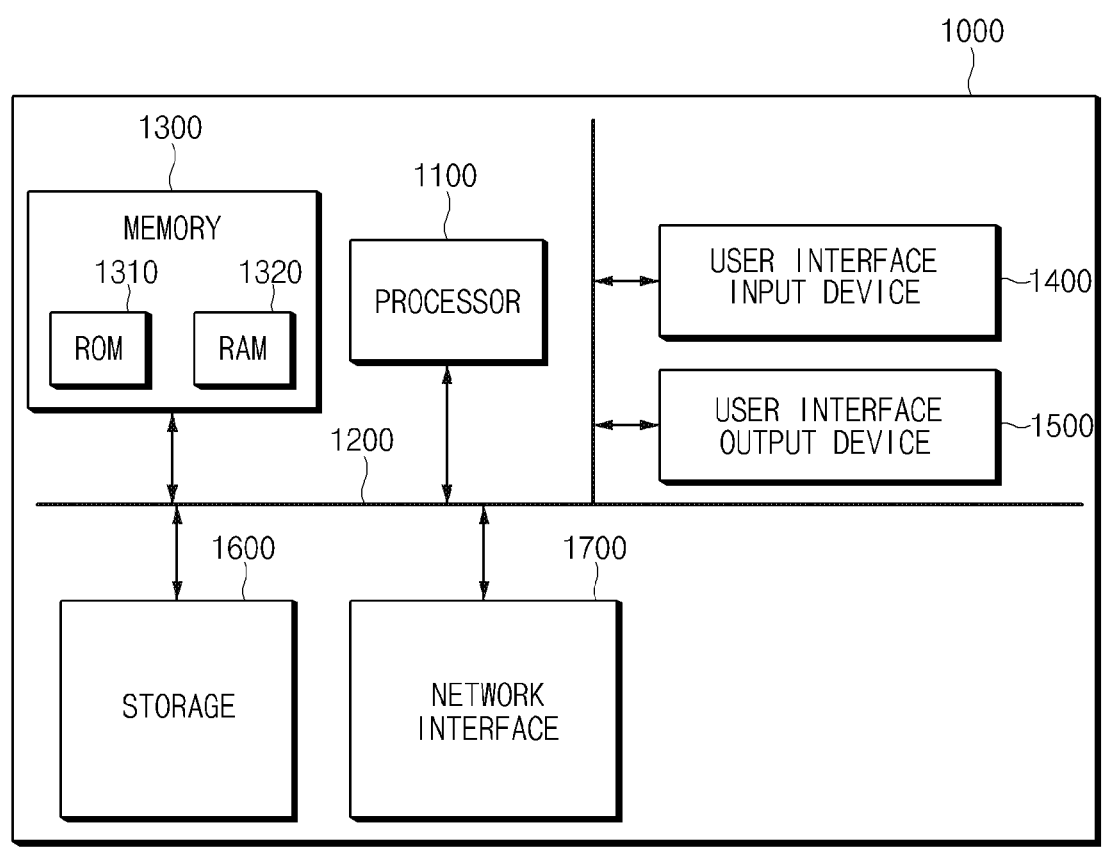
FIG. 5 is a block diagram illustrating a computing system for executing a method of controlling access to image data of a vehicle.

FIG. 5 is a block diagram illustrating a computing system for executing a method of controlling access to image data of a vehicle according to another form of the present disclosure.

Referring to FIG. 5, the method of controlling access to image data of a vehicle may be implemented through a computing system. A computing system 1000 may include at least one processor 1100, a memory 1300, a user interface input device 1400, a user interface output device 1500, storage 1600, and a network interface 1700, which are connected with each other via a bus 1200.

The processor 1100 may be a central processor unit (CPU) or a semiconductor device that processes instructions stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the forms disclosed herein may be embodied directly in hardware or a software module executed by the processor 1100, or in a combination thereof. The software module may reside on a storage medium (that is, the memory 1300 and/or the storage 1600) such as a RAM, a flash memory, a ROM, an EPROM, an EEPROM, a register, a hard disk, a removable disk, a CD-ROM. The exemplary storage medium may be coupled to the processor 1100, and the processor 1100 may read information out of the storage medium and may record information in the storage medium. Alternatively, the storage medium may be integrated with the processor 1100. The processor 1100 and the storage medium may reside in an application specific integrated circuit (ASIC). The ASIC may reside within a user terminal. In another case, the processor 1100 and the storage medium may reside in the user terminal as separate components.

According to an image data access control apparatus for a vehicle and a method thereof according to another form of the present disclosure, it is possible to protect the image data from unauthorized users by permitting previously registered users to have access to the image data (recorded driving image) of the vehicle.

Hereinabove, although the present disclosure has been described with reference to exemplary forms and the accompanying drawings, the present disclosure is not limited thereto, but may be variously modified and altered by those skilled in the art to which the present disclosure pertains without departing from the spirit and scope of the present disclosure claimed in the following claims.

Therefore, the exemplary forms of the present disclosure are provided to explain the spirit and scope of the present disclosure, but not to limit them, so that the spirit and scope of the present disclosure is not limited by the forms. The scope of the present disclosure should be construed on the basis of the accompanying claims, and all the technical ideas within the scope equivalent to the claims should be included in the scope of the present disclosure.

What is claimed is:

1. An image data access control apparatus for a vehicle, the image data access control apparatus comprising:
a storage configured to store image data of the vehicle;
a communicator configured to communicate with a user device;
an authentication processor configured to authenticate the user device; and
a controller configured to determine whether the user device is able to have access to the image data based on an authentication result of the authentication processor,
wherein the controller is further configured to:
assign different rights based on classes of user devices,
provide an editing function for the image data when the user device is classified as a first class, and
transmit a text message informing of an attempt to access the image data to a user device of a vehicle owner when an unauthorized user attempts to access the image data.

2. The image data access control apparatus of claim 1, wherein the authentication processor and the controller are connected to each other through a vehicle network.

3. The image data access control apparatus of claim 1, wherein the storage is embedded in the vehicle.

4. The image data access control apparatus of claim 1, wherein the controller is configured to receive a request for access to the image data through a user interface of an audio video navigation (AVN) system provided in the vehicle.

5. The image data access control apparatus of claim 1, wherein the controller is configured to receive a request for access to the image data through a universal serial bus (USB) terminal provided in the vehicle.

6. The image data access control apparatus of claim 1, wherein the controller is activated when power is supplied to an electric load of the vehicle.

7. The image data access control apparatus of claim 1, wherein the communicator is configured to communicate with the user device through at least one of Bluetooth™, radio frequency identification (RFID), infrared data association (IrDA), ultra wide band (UWB), ZigBee, or near field communication (NFC).

8. The image data access control apparatus of claim 1, wherein the authentication processor is configured to authenticate the user device based on a list of previously recorded user devices that have a permit to access to the image data.

9. A method of controlling access to image data of a vehicle, the method comprising:
   storing, by a storage, image data recorded by the vehicle;
   communicating, by a communicator, with a user device;
   authenticating, by an authentication processor, the user device;
   determining, by a controller, whether the user device has a permit to access to the image data; and
   transmitting a text message informing of an attempt to access the image data to a user device of a vehicle owner when an unauthorized user attempts to access the image data,
   wherein determining whether the user device has a permit to access to the image data includes:
      assigning different rights based on classes of user devices; and
      providing an editing function for the image data when the user device is classified as a first class.

10. The method of claim 9, wherein determining whether the user device has a permit to access to the image data includes:
   receiving an authentication result from the authentication processor through a vehicle network.

11. The method of claim 9, wherein storing the image data includes:
   storing the image data in a storage embedded in the vehicle.

12. The method of claim 9, wherein determining whether the user device has a permit to access to the image data includes:
   receiving a request for access to the image data through a user interface of an audio video navigation (AVN) system provided in the vehicle.

13. The method of claim 9, wherein determining whether the user device has a permit to access to the image data includes:
   receiving a request for access to the image data through a universal serial bus (USB) terminal provided in the vehicle.

14. The method of claim 9, wherein determining whether the user device has a permit to access to the image data is performed when power is supplied to an electric load of the vehicle.

15. The method of claim 9, wherein communicating with the user device includes:
   communicating with the user device through at least one of Bluetooth™, radio frequency identification (RFID), infrared data association (IrDA), ultra wide band (UWB), ZigBee, or near field communication (NFC).

16. The method of claim 9, wherein authenticating the user device includes: authenticating the user device based on a list of recorded user devices previously permitted to access to the image data.

* * * * *